United States Patent
Panosian et al.

(10) Patent No.: US 10,993,487 B1
(45) Date of Patent: May 4, 2021

(54) CUSTOMIZABLE KNEE PADS AND PROCESS OF FORMING THE SAME

(71) Applicant: TOUGHBUILT INDUSTRIES, INC., Lake Forest, CA (US)

(72) Inventors: Michael H. Panosian, Irvine, CA (US); Joshua Keeler, Lake Forest, CA (US)

(73) Assignee: TOUGHBUILT INDUSTRIES, INC., Lake Forest, CA (US)

( * ) Notice: Subject to any disclaimer, the term of this patent is extended or adjusted under 35 U.S.C. 154(b) by 0 days.

(21) Appl. No.: 16/916,891

(22) Filed: Jun. 30, 2020

(51) Int. Cl.
*A41D 13/06* (2006.01)
*B29C 44/12* (2006.01)
(Continued)

(52) U.S. Cl.
CPC ........ *A41D 13/065* (2013.01); *B29C 44/1228* (2013.01); *B29C 44/42* (2013.01); *B29K 2713/00* (2013.01); *B29L 2031/768* (2013.01)

(58) Field of Classification Search
CPC .............. A41D 13/0543; A41D 13/015; A41D 13/0153; A41D 13/065; A41D 19/01523; A41D 2600/10; A41D 13/08; A41D 13/082; A41D 13/05; A41D 13/0518; A41D 2500/50; A41D 31/28; A41D 31/005; A41D 31/285; F41H 5/0492; A63B 71/1225; A63B 2071/125; A63B 2071/1241; A63B 2071/1258; A63B 2102/24; A63B 69/0026; A63B 2071/1275; A63B 2071/1283; A63B 2102/22; A63B 2209/00; A63B 2225/09; A63B 2225/096; B29D 35/14;
(Continued)

(56) References Cited

U.S. PATENT DOCUMENTS 7,018,351 B1    3/2006  Iglesias et al.
7,288,076 B2 *  10/2007 Grim ..................... A61F 5/0111
                                                       602/27
(Continued)

FOREIGN PATENT DOCUMENTS

CN       107361426 A    11/2017
CN       207492128      6/2018
(Continued)

*Primary Examiner* — Robert H Muromoto, Jr.
(74) *Attorney, Agent, or Firm* — Nolte Lackenbach Siegel; Myron Greenspan

(57) ABSTRACT

A customizable knee pad includes a foam main body having an anterior surface A and a posterior surface molded to the shape of the knee. The anterior surface is formed with an array of spaced recesses covering the knee to be protected. Each recess defines a negative incremental area and, cumulatively, define an area $A_r$. The effective area $A_{eff}$ of the anterior surface is equal to $A_{eff}=A-A_r$. A fabric sheet covers the posterior surface. A gel pad is provided within the main body in close proximity to the fabric sheet. The main body of the knee pad is injection molded with the gel pad and fabric sheet in place to bond the fabric sheet and gel pad to the molded main body to be effectively integrated therewith. Changing the recesses' shape and spacing alters the flexibility of the knee pad and renders it harder or softer.

14 Claims, 6 Drawing Sheets

(51) Int. Cl.
*B29C 44/42* (2006.01)
*A63B 71/08* (2006.01)
*B29L 31/00* (2006.01)

(58) Field of Classification Search
CPC .............. B29D 35/148; B29D 99/0064; B29D 99/0092; A42B 1/08; A42B 3/063; A42B 3/121; A42B 3/124; A42B 3/125; A42B 3/127; B29C 44/42; B29C 44/1228; B29K 2713/00; B29L 2031/768
See application file for complete search history.

(56) References Cited

U.S. PATENT DOCUMENTS

| | | | | |
|---|---|---|---|---|
| 7,930,782 | B2* | 4/2011 | Chen | C08L 53/02 5/655.5 |
| 8,075,981 | B2* | 12/2011 | Pearce | B29C 48/08 428/174 |
| 8,434,748 | B1* | 5/2013 | Pearce | A47C 27/20 267/142 |
| 8,628,067 | B2* | 1/2014 | Pearce | A47C 27/16 267/142 |
| 8,726,424 | B2 | 5/2014 | Thomas et al. | |
| 10,293,241 | B2* | 5/2019 | Rodrick | A41D 13/0543 |
| 2003/0171703 | A1* | 9/2003 | Grim | A61F 5/0111 601/152 |
| 2007/0197949 | A1* | 8/2007 | Chen | C09J 153/025 602/41 |
| 2007/0238835 | A1* | 10/2007 | Chen | C08L 53/025 525/240 |
| 2009/0035524 | A1* | 2/2009 | Wyner | B29C 66/433 428/156 |
| 2010/0183847 | A1* | 7/2010 | Pearce | B32B 3/28 428/158 |
| 2010/0223730 | A1* | 9/2010 | Pearce | A47C 27/144 5/655.5 |
| 2010/0227091 | A1* | 9/2010 | Pearce | B32B 5/024 428/36.1 |
| 2010/0229308 | A1* | 9/2010 | Pearce | A47C 27/16 5/655.5 |
| 2011/0277923 | A1* | 11/2011 | Fox | A43B 13/189 156/245 |
| 2012/0076985 | A1* | 3/2012 | Dassler | A63B 71/1225 428/156 |
| 2014/0259261 | A1* | 9/2014 | Mackey | A63B 71/1225 2/22 |
| 2014/0259333 | A1 | 9/2014 | Marquez et al. | |
| 2015/0033433 | A1* | 2/2015 | Mackey | A63B 69/0026 2/22 |
| 2016/0136911 | A1* | 5/2016 | Fox | B29C 65/48 156/245 |
| 2016/0295935 | A1* | 10/2016 | Foster | A41D 19/01523 |
| 2017/0042715 | A1 | 6/2017 | Park | |
| 2018/0035739 | A1 | 2/2018 | Cohen et al. | |
| 2018/0153244 | A1* | 6/2018 | Kirshon | B29C 39/10 |
| 2018/0168267 | A1 | 6/2018 | Giles | |
| 2018/0326290 | A1* | 11/2018 | Rodrick | A41D 13/0153 |
| 2019/0145740 | A1* | 5/2019 | Czerski | F41H 1/02 2/463 |
| 2019/0161591 | A1 | 5/2019 | Farris et al. | |
| 2019/0269996 | A1* | 9/2019 | Rodrick | A41D 13/0543 |
| 2020/0070035 | A1* | 3/2020 | Vaillancourt | A41D 13/0543 |

FOREIGN PATENT DOCUMENTS

| | | |
|---|---|---|
| EP | 1006960 | 1/2003 |
| EP | 3329973 A1 | 6/2018 |
| JP | 3616084 B2 | 2/2005 |
| JP | 2008512170 | 4/2008 |
| KR | 20190014581 | 2/2019 |
| RU | 2308373 | 11/2005 |
| WO | 2007101289 | 9/2007 |

* cited by examiner

CUSTOMIZABLE KNEE PADS AND PROCESS OF FORMING THE SAME

BACKGROUND OF THE INVENTION

1. Field of the Invention

The present invention generally relates to knee protective devices and, more specifically, to customizable knee pads and process of forming the same.

2. Description of Background Art

Manufacturers offer numerous knee pads that are intended for different activities, for example, for sports and extreme sports, for dancing and acrobatics, for working and military purposes. In addition, all of these knee pads are being adjusted for more specific purposes, for example, nowadays every knee pad has to be not only protective, but also comfortable, flexible, lightweight, breathable, easy to use and wash, stylish, qualitative, affordable and so on. In one word, needs and wants of consumers and professionals are only increasing, therefore manufacturers constantly have to develop and innovate their products.

The main function of knee pads is knee protection against different knee injuries that are usually caused by blows, attrition, pressure and other outer impacts during physical activities. Considering the fact, that protection is not the only required feature of knee pads, manufacturers have to invent the way, how to combine protection with other necessary features. One of such attempts is usage of different materials which could provide the maximum of features, including protection, comfort, flexibility, likable and modern design, quality and affordability.

The main element of a knee pad is padding or, in other words, cushioning that is placed on the kneecap and that has the main role in the prevention of knees injuries. Padding can be made of various materials, for example, polyurethane foam, polyethylene foam, ethyl vinyl acetate foam, nylon foam, neoprene foam, polyvinyl chloride foam, extruded polystyrene foam, rubber, plastic, gel, carbon fiber and other materials.

Another difference is knee pads cushioning type—some of them have a shell or cap type padding that is usually is made of plastic, rubber, gel, carbon fiber or other durable and high density material which can ensure constant protection. The inside of these shells is usually covered by a softer and more elastic material to provide a better conformation to the shape of the kneecap and thus comfort. Some knee pads have padding which is made of soft, but durable and protective material such as foam—PU foam, PE foam, EVA foam, PVC foam, XPS foam, nylon foam and neoprene foam. Many knee pads have hex-pad padding which is made of dozens of separate hexagon type pads, therefore they are providing better conformation to the shape of the knee and thus comfort and flexibility. These hexagon type pads usually are made of some foam which is able to absorb the shock of different blows. Hexagon type pads often are called as honeycomb type pads because of their similarity. Some of knee pads have bubble type cushioning which also is made of some foam to protect the knee against different impacts.

Knee pads can be categorized by their usage in different niches, for example, sports knee pads, dance knee pads, work knee pads, military knee pads and others. These knee pads differ from each other with functionality and level of protection. For example, knee pads for sports and dancing are more comfortable and flexible, but knee pads for working and military are thicker, denser and more durable.

Working knee pads, especially for the pro trades may not be so flexible, but they have to be extremely durable and comfortable, because in such works as carpeting, concreting, tiling, flooring, gardening and construction workers have to spend a lot of time on their knees, therefore the padding has to be as comfortable as possible, thereby reducing the pressure on knees and thus knee pain and fatigue. Working knee pads for pros in the trades are mostly used for preventing of occupational knee injuries. There are many working knee pads, for example, hard-cap, curved soft cap, flat-cap knee pads, kneeling pads, rolling knee pads, knee inserts, and all of them are designed for certain and specific purposes.

Military knee pads or, in other words, tactical knee pads usually are the part of the uniform among military and they are made of extremely durable and dense bulletproof material, making them bullet-proof and thus safe in almost every situation. Such knee pads are meant not only for safety against bullets or other dangerous impacts, but also for knee protection against bruises or abrasions caused by crawling or squatting during warfare or other training exercises.

U.S. Pat. No. 7,018,351 discloses an orthopedic support using a molded pad and a rigid shell. The internal structure is molded to include the geometrically shaped cells of various sizes, shapes and thickness to provide different levels of localized comfort to the user. The pad is made from a thermoplastic elastomer (TPE) that is spring-like and resists compression sets. The TPE material is injection molded to include detailed designs such as geometrically shaped cells. Soft foam can be embedded between the rigid cells in the padding. As another option, gel is used in place of the soft foam. However, the level of desired cushioning is provided by utilizing multiply sized cells, rods and various protrusions. As an alternate to the use of variously shaped cells and protrusions a softer foam may be embedded between rigid cell walls. Typically, the over mold that seals the TPE pad to the shell is made of the same material as the padding and also partially covers the shell. Another option is to use gel in place of the soft phone or the molded TPE pad.

While numerous knee pad designs have been proposed they have not been readily customizable and have typically required intricate and expensive molds and processes for manufacturing the products to adapt them for specific applications.

SUMMARY OF THE INVENTION

Accordingly, it is an object of the invention to provide a knee pad that does not have the disadvantages inherent in prior art knee pads It is another object of the invention to provide a knee pad that is readily customizable.

It is still another object of the invention to provide a knee pad as aforementioned that is simple in construction and economical to manufacture.

It is yet another object of the invention to provide a knee pad that is easy and convenient to use.

It is a further object of the invention to provide a knee pad that can be formed to provide a desired level of softness or hardness, depending the use or application.

It is still a further object of the invention to provide a molded knee pad that can be over molded on a gel insert that becomes integrated with the foam shell or form, thereby simplifying the molding process and preventing shifting of the gel insert over time.

It is yet a further object of the invention to provide a molded knee pad that has a soft fabric backing sheet that can be integrated with the molded foam shell or form to facilitate manufacture and prevent separation of the fabric sheet from the foam shell or form after extended use In order to achieve the above objects, as well as others that will become evident to those skilled in the art, a customizable knee pad in accordance with the invention comprises a main body of a compressible material having an anterior or exterior surface defining a surface A and a posterior surface molded to the shape of the knee. The anterior surface is formed with an array of spaced recesses over a predetermined region covering the knee to be protected. Each recess defines an incremental area and said recesses over a predetermined region collectively or cumulatively define an area $A_r$. The effective area $A_{eff}$ of the anterior surface that is not recessed is approximately equal to $A_{eff}=A-A_r$. A fabric sheet covers the rear or posterior surface as will be more fully described. A gel pad is provided within the main body in proximity to the fabric sheet.

The main body of the knee pad is injection molded with the gel layer and fabric sheet in place during the molding process to bond the fabric sheet and gel pad to the molded main body to be integrally formed therewith. Since the force required to deform a solid is directly proportional to the effective surface area that is deformed in compression at least in the linear region of the material that follows Hooks Law by selectively modifying the effective surface area in the predetermined region can alter the flexibility of the material in compression and, therefore, render the material harder or softer.

The method of forming a knee pad in accordance with the invention includes the steps of providing a mold configured to impart to an interior surface of any paired with an array of recesses over the predetermined region for protection of the knee pad, the density and sizes of the resulting recesses determining the affected area for compression. A gel insert is supported within the mold and the mold is covered with a fabric sheet or layer in close proximity to the supported gel insert. A spray foam is then injected into the mold until the mold is filled with foam to encapsulate the gel insert and contact the fabric sheet so that the foam bonds to the gel insert and the fabric sheet. The cumulative incremental areas of the resulting recesses on the interior surface of the resulting knee pad main body in the separation of the recesses is selected to provide knee pads that have normal or medium hardness, knee pads that are softer or harder for the same or like density foam materials.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
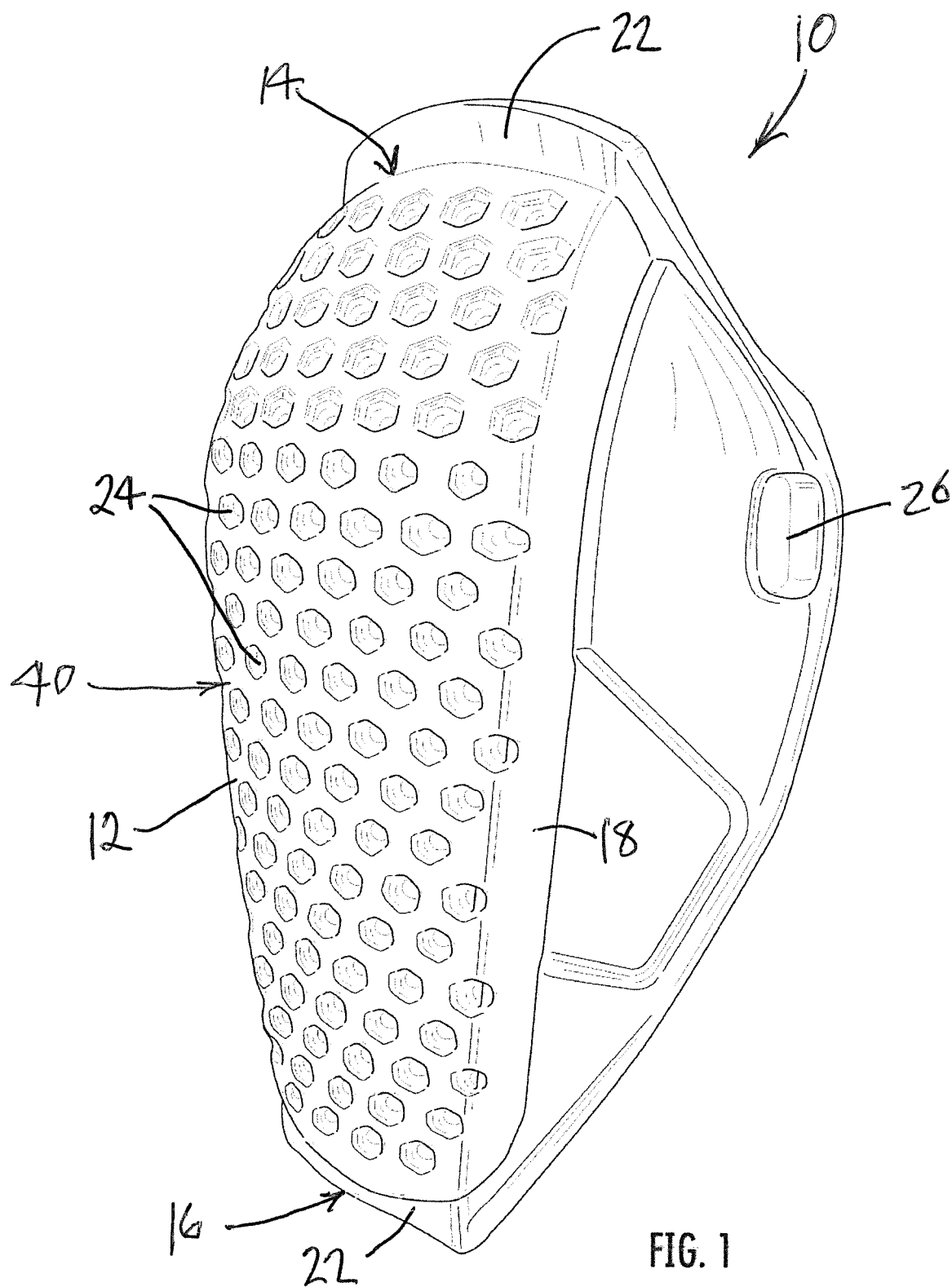
FIG. 1 is a perspective view of a knee pad in accordance with the invention.
Figure 2:
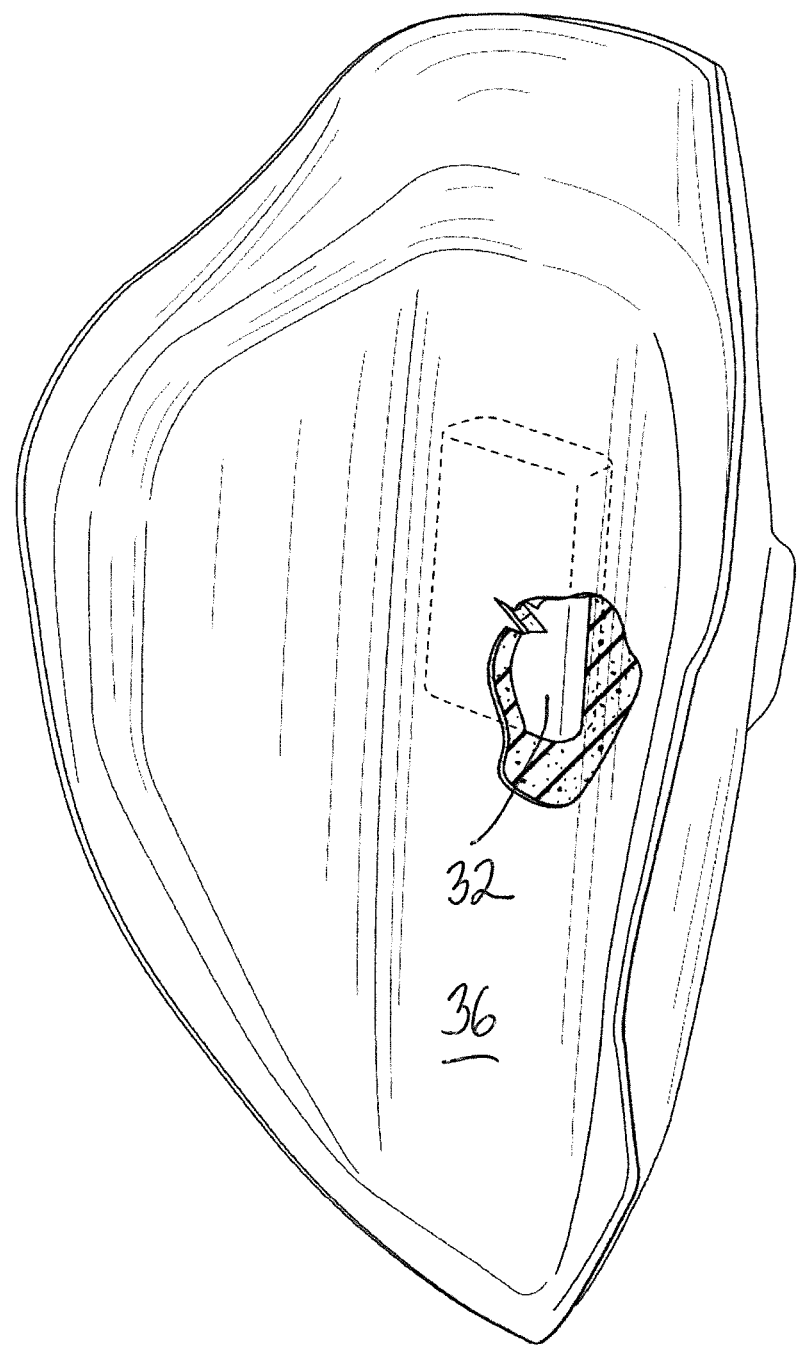
FIG. 2 is a rear perspective view of the knee pad shown in FIG. 1.
Figure 3:
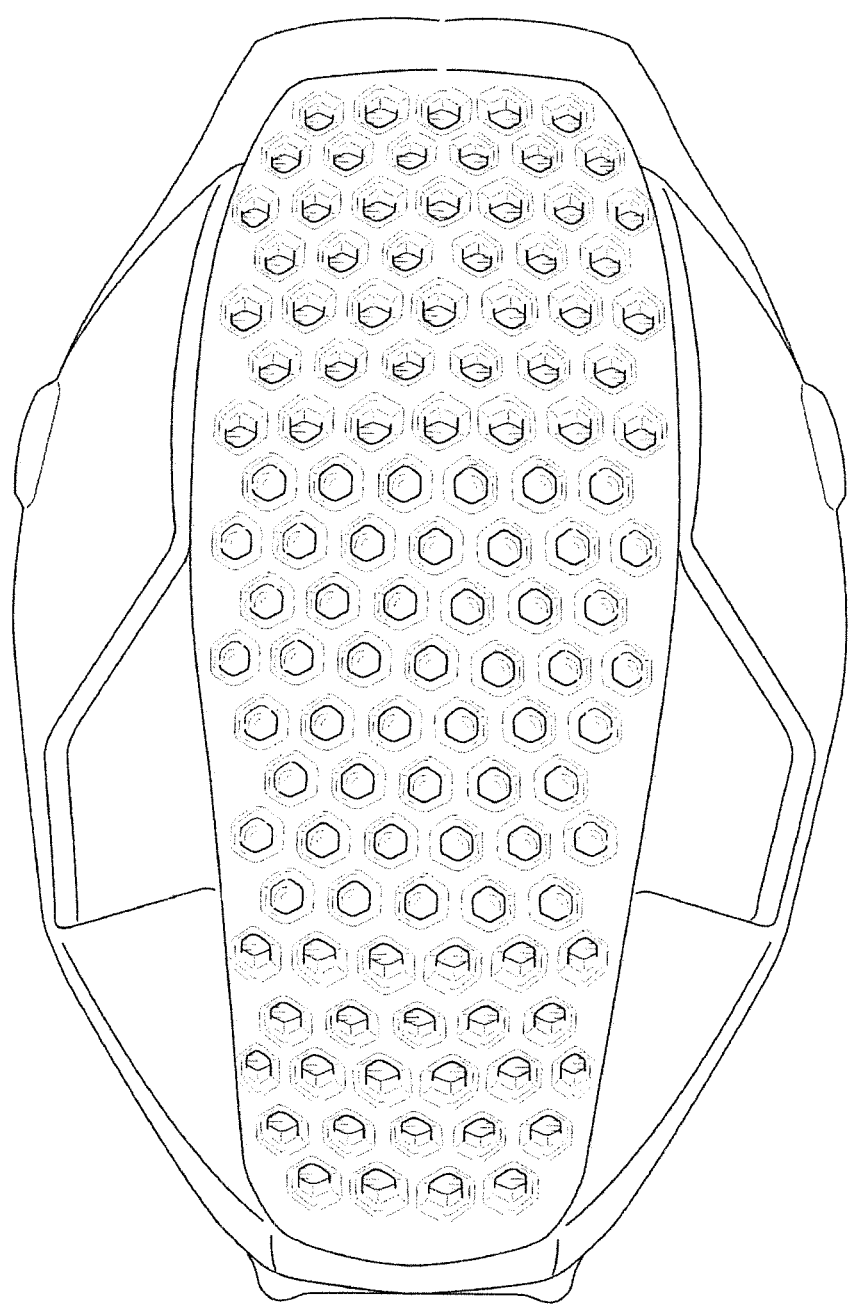
FIG. 3 is a front elevation view of the knee pad shown in FIGS. 1 and 2.

Referring now specifically to the Figures, in which the identical or similar parts are designated by the same reference numerals throughout, and first referring to FIG. 1, a knee pad in accordance with the present invention is generally designated by the reference 10.

In its final molded form the main body 40 of the knee pad 10 defines an outer or anterior surface 12 that has a top end 14, a bottom end 16 and lateral ends 18. The anterior or outer surface 12 defines a region that covers and protects the knee. However, while the anterior surface 12 is shown to extend between bottom and top extensions 20, 22 the effective anterior surface can be modified to render it more centralized over the knee cap short of the extensions 20, 22.

The anterior or outer surface 12 is formed with an array of recesses 24 two the effective area of the anterior or outer surface. Thus, if the overall area of the anterior or outer surface 12 is A and the cumulative area represented by the array of recesses 24 is $A_r$ than the effective surface area $A_{eff}$ is $A_{eff}=A-A_r$. It is clear that the effective surface area $A_{eff}$ decreases as the cumulative area $A_r$ of the recesses 24 increases.

Figure 4:
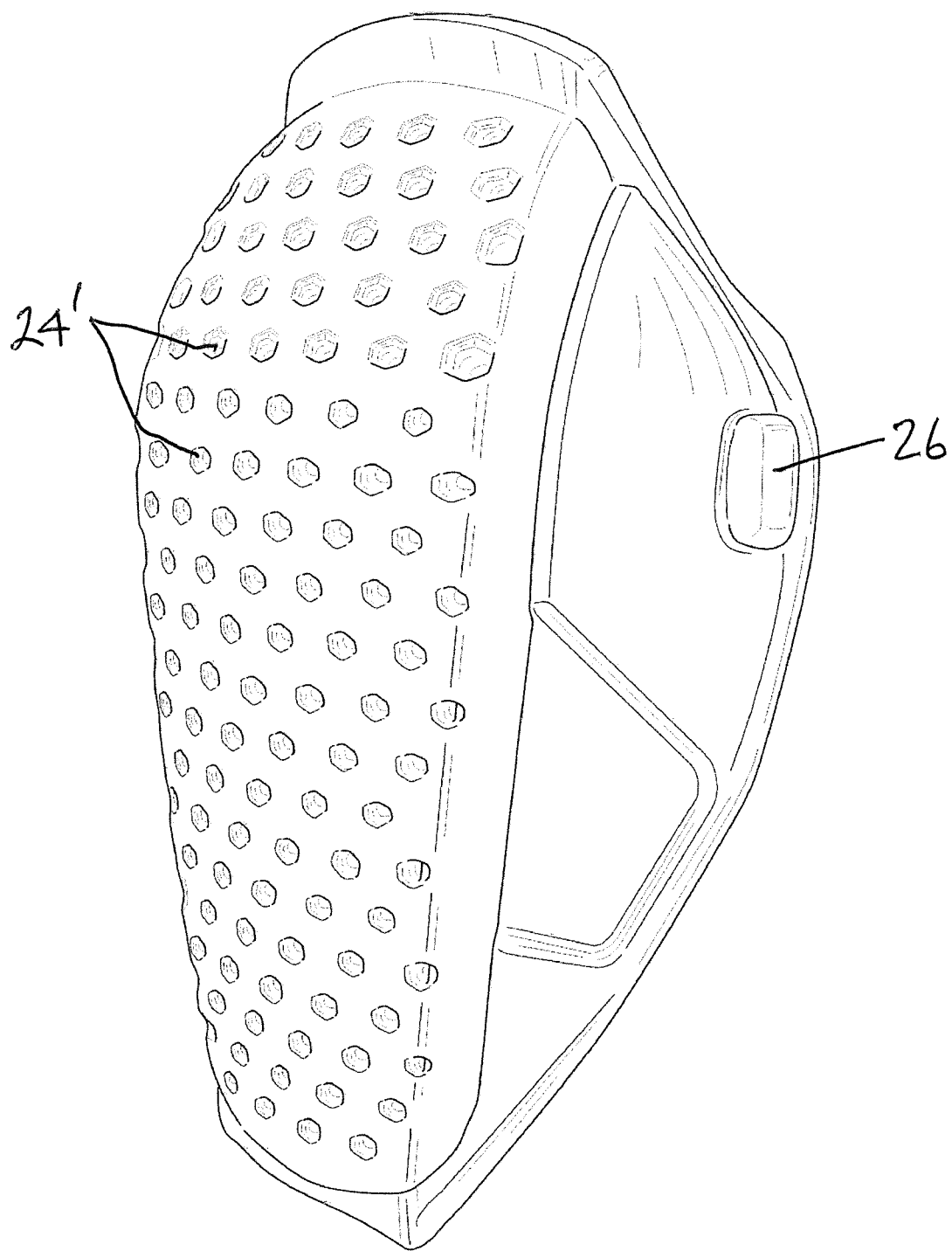
FIG. 4 is similar to FIG. 1 which shows a modified array of recesses having different sizes and spacings from the ones shown in FIG. 1.

Referring to FIG. 4, an alternate array of recesses is shown in which the size of the recesses 24' is smaller than those shown in FIG. 1 and the spacing between the recesses within the array is also smaller. Using the array of FIG. 4 would result in a stiffer knee pad. It will be clear, therefore, that selecting the size and shapes of the recesses as well as their spacing within the array can produce a knee pad for normal use, a softer knee pad or a harder one using the same or similar foam material depending on the application or use to which the knee pad is intended. It may also be possible to use the same mold only modified with an insert to reflect the size, shape and spacing of the recesses within the array.

The specific cross-sectional shape of the recesses 24 is not critical and recesses in the shapes of circles, squares, hexagons triangles, etc. can be used. The cumulative area of the recesses 24 can modified by changing not only the shapes and sizes of the recesses but the spacing of the recesses in the array.

The knee pad can also be formed without the recesses 24. The knee pad would still benefit from the unitary or integrated bonding of the gel insert 32 and fabric sheet 36 to the injected foam main body 40 that would resist separation of the gel insert and/or fabric sheet from the main body with extended use.

The lateral sides 18 extend to each side of the kneepad and provide lateral protection to the knee as well as provides rigidity to the main body of the resulting knee pad. The top and bottom extensions 20, 22 also help to rigidify the structure and these are not within the protective region of the knee pad that can be adjusted or modified in terms of hardness and softness. The lateral sides 18 also include ears 26 used to attach a strap for securing the knee pad to the leg of the user. Any conventional straps, including elastic straps, can be used.

Figure 5:
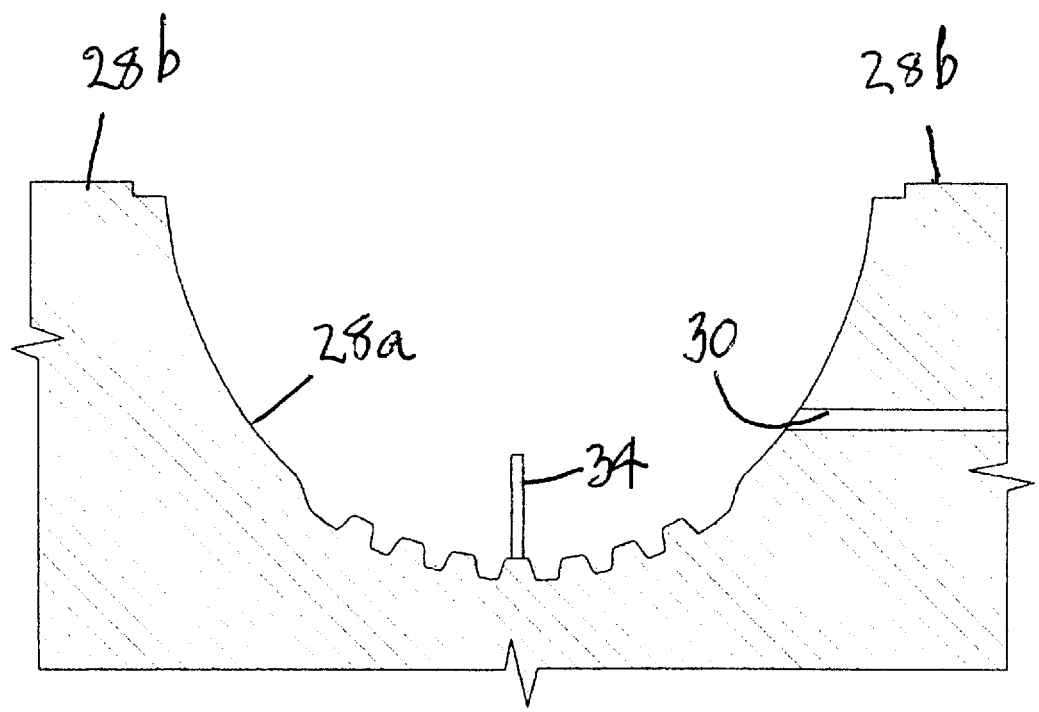
FIG. 5 is a cross-sectional view of a mold used to form the knee pad shown in FIGS. 1 and 2.
Figure 6:
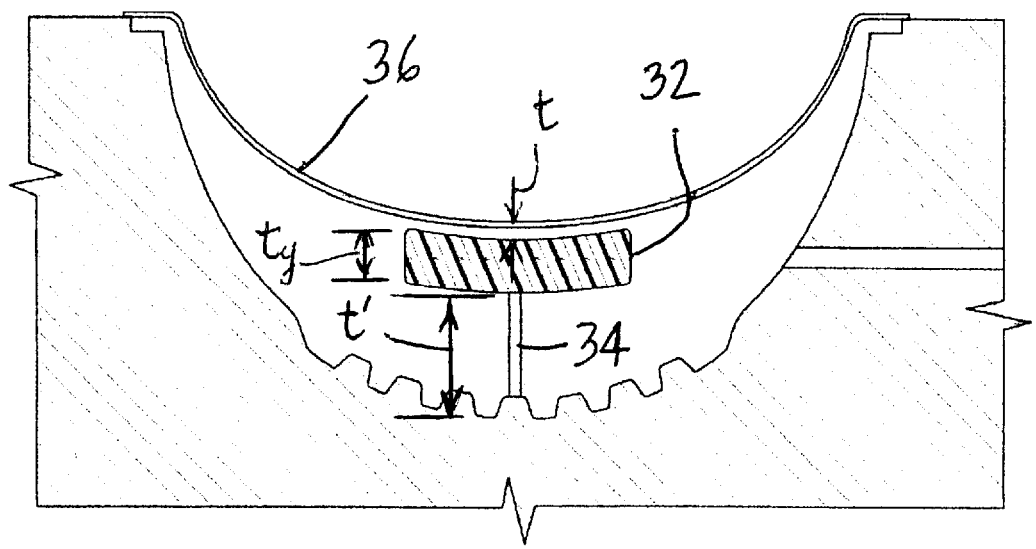
FIG. 6 is similar to FIG. 5 showing the posterior or inside sheet of fabric supported at the ends of the mold and a gel pad or insert supported in close proximity behind the fabric sheet.
Figure 7:
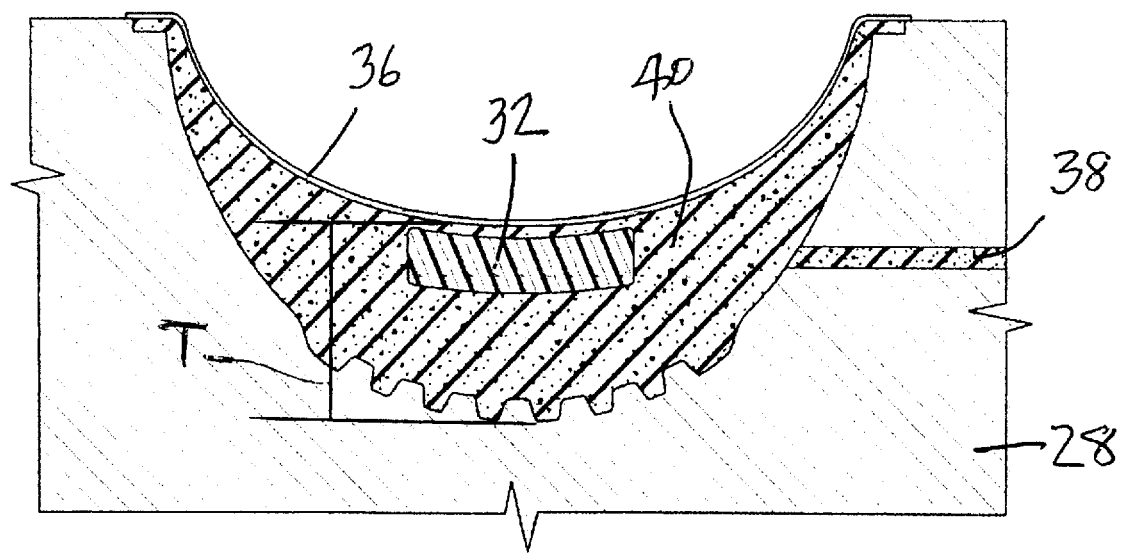
FIG. 7 is similar to FIGS. 5 and 6 and show the knee pad after the foam material has been injected to contact and/or encapsulate the gel insert and fabric sheet thereby bonding the knee pad with the fabric sheet and gel insert.

Referring to FIGS. 5-7, the process of making the knee pad in accordance with the invention is illustrated. The mold 28 includes an internal surface 28a that conforms to the outer or anterior surface 12. In the top of 28 and to each side of the internal surface 28a are support or bearing surfaces 20b. The mold has an inlet channel 34 for injecting foam material to form the knee pad 10.

In FIG. 6, a gel pad 32 is supported above the surface 28a by a support member 34. A fabric sheet will layer 36 extends across the surface 20a and supported by the support or bearing surfaces 20b. The fabric layer 36 is conformed to the desired shape to generally correspond to the shape and size of the knee to be protected. The support member 34 is selected to position the gel pad 32 in close proximity to the fabric sheet.

Referring to FIG. 7, the foam 38 is shown injected through the channel or passageway 32 fill the entire volume between the mold surface 28 a and the fabric sheet 36 thereby fully encapsulating the gel pad 32 and contacting the inner surface of the fabric sheet 36. As the foam 38 sets and bonds to both the gel insert or pad 32 as well as to the fabric sheet 36. Such bond is very strong and resists separation of the fabric sheet 36 from the main body 40, in most cases being stronger than a bond between the fabric sheet 36 and an applied adhesive. Also, because of the strong bond between the main body and the gel pad or insert 32 this ensures that the gel pad does not shift initially or with extended use. This is different from most knee pads that employ a gel insert placed within a surface recess after the main body 40 has been molded, a common complaint with existing knee pads.

The foregoing is considered as illustrative only of the principles of the invention. Further modifications and changes will readily occur to those skilled in the art. The invention is not limited to the exact construction and operation shown and described, and accordingly, all suitable modifications and equivalents may be resorted to, falling within the scope of the invention.

The invention claimed is:

1. An insert for a knee pad comprising a main body formed of a compressible material, such as foam, having an anterior or exterior surface and a posterior or interior surface moldable to the shape of a user's knee; a fabric layer extending along and conforming to said interior surface; and a gel pad positioned between said interior and exterior surfaces and positioned to be juxtaposed with a kneecap of the user when the knee pad is worn by the user, said main body being injection molded to bond to said fabric layer and fully encapsulate said gel pad within said compressible material, whereby a layer of compressible material is formed between said gel pad and said fabric layer.

2. An insert for a knee pad as defined in claim 1, wherein said compressible material is foam.

3. An insert for a knee pad as defined in claim 1, wherein said compressible material is formed on said exterior surface with an array of recesses configured to provide a knee pad of a desired softness.

4. An insert for a knee pad as defined in claim 1, wherein said main body has lateral sides, and ears on said lateral sides for attachment of a knee pad strap.

5. A method of producing an insert for a knee pad comprising the steps of positioning and maintaining a gel pad inside a mold; arranging a fabric sheet in close proximity to but spaced from said gel pad; forming the knee pad insert by injection molding to form an anterior or exterior surface and a posterior or interior surface that can be molded to the shape of a user's knee and to fully encapsulate said gel pad to provide a layer of compressible material between said gel pad and said fabric layer.

6. A method as defined in claim 5, wherein said main body is formed by injection of a foam material.

7. An insert for a knee pad comprising a main body formed of a compressible material, such as foam, having an anterior or exterior surface and a posterior or interior surface molded to the shape of the knee; a fabric layer forms or defines the posterior surface; and a gel pad provided in close proximity to and spaced from said fabric layer, said main body being injection molded to fully encapsulate said gel pad and fabric layer in the mold to bond said fabric sheet and gel pad to said main body.

8. A method of producing a knee pad comprising the steps of positioning and maintaining a gel pad inside a mold at a predetermined height approximately equal to a thickness of the knee pad at the point where the knee pad contacts a user's knee cap; securing a fabric sheet to have at least a portion of said fabric sheet in close proximity to and spaced from said gel pad; forming the knee pad by injection molding to form an anterior or exterior surface and a posterior or interior surface, said fabric sheet forming and defining the posterior surface, said main body being injection molded to fully encapsulate said gel pad and fabric layer to bond said fabric sheet and gel pad to said main body.

9. An insert for a knee pad as defined in claim 1, wherein said anterior surface is formed with an array of spaced recesses over a predetermined region.

10. An insert for a knee pad as defined in claim 1, wherein said gel pad is spaced from said interior surface and said fabric layer a distance smaller than a distance of said gel pad from said exterior surface.

11. An insert for a knee pad as defined in claim 10, wherein said main body of said insert has a maximum thickness T between said interior and exterior surfaces and said gel pad is spaced a distance t from said interior surface and $T/t \sim 13$.

12. An insert for a knee pad as defined in claim 10, wherein said gel pad has a thickness $t_g$ and said main body of said insert has a maximum thickness T and $T/t_g \sim 3.7$.

13. An insert for a knee pad as defined in claim 10, wherein said gel pad is spaced from said interior surface a distance t and is spaced a distance t' from said exterior surface and $t'/t \sim 8.5$.

14. An insert for a knee pad as defined in claim 10, wherein said gel pad has thickness $t_g$ and is spaced from said interior surface a distance t and $t_g/t \sim 3.5$.

* * * * *